(12) United States Patent
Kilincsoy et al.

(10) Patent No.: US 8,424,967 B2
(45) Date of Patent: Apr. 23, 2013

(54) CUSHION FOR A SEAT AND METHOD OF ADAPTING SAME

(75) Inventors: Uemit Kilincsoy, Munich (DE); Alexander Durt, Inning am Ammersee (DE); Matthias Franz, Brannenburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/186,240

(22) Filed: Jul. 19, 2011

(65) Prior Publication Data

US 2011/0272993 A1 Nov. 10, 2011

Related U.S. Application Data

(63) Continuation of application No. PCT/EP2010/002073, filed on Mar. 31, 2010.

(30) Foreign Application Priority Data

Apr. 2, 2009 (DE) .......................... 10 2009 016 050

(51) Int. Cl.
*A47C 7/46* (2006.01)
(52) U.S. Cl.
USPC .............. 297/284.3; 297/452.28; 297/452.41; 5/655.3; 5/710; 5/712
(58) Field of Classification Search ............... 297/284.3, 297/284.6, 452.41, 452.28; 5/644, 654, 655.3, 5/710, 712, 932
See application file for complete search history.

(56) References Cited

U.S. PATENT DOCUMENTS

| 2,753,573 | A | * | 7/1956 | Barker | 5/712 |
| 4,139,917 | A | * | 2/1979 | Fenwick | 5/602 |
| 4,514,010 | A | * | 4/1985 | Sabater Gonzalez | 297/284.1 |

(Continued)

FOREIGN PATENT DOCUMENTS

| DE | 2 148 401 | 4/1973 |
| DE | 89 09 741 U1 | 10/1989 |

(Continued)

OTHER PUBLICATIONS

German Search Report dated Jan. 8, 2010 including partial English-language translation (Nine (9) pages).

(Continued)

*Primary Examiner* — Peter R. Brown
(74) *Attorney, Agent, or Firm* — Crowell & Moring LLP

(57) ABSTRACT

A seat includes a bearing structure and a number of cushions. The cushions cover the entire area of the seat surface and the backrest of the seat. Each cushion is formed of a textile spacer structure held in a fluid-tight casing. The casing has a connection for a hose line. Before a user sits on the seat, the hose line is open to the outside air. Due to the force applied by the seat user, the cushion and spacer structure are compressed, whereby simultaneously air is displaced out of the cushion. The cushions thus experience a contouring according to the body shape of the seat user. After the user sits down, the contouring can be fixed by blocking device the hose line, and thus separating the reduced air volume in the inside of the cushion from the outside air. In this way, the contouring of the seat cushions is maintained when the seat user leaves the seat.

15 Claims, 2 Drawing Sheets

U.S. PATENT DOCUMENTS

| | | | |
|---|---|---|---|
| 4,634,179 A * | 1/1987 | Hashimoto et al. | 297/284.6 |
| 4,846,917 A * | 7/1989 | Hartel et al. | 156/286 |
| 5,029,939 A | 7/1991 | Smith et al. | |
| 5,556,169 A | 9/1996 | Parrish et al. | |
| 5,587,933 A * | 12/1996 | Gross | 702/139 |
| 5,595,806 A * | 1/1997 | Korfmacher | 428/69 |
| 6,948,204 B2 * | 9/2005 | Chae | 5/709 |
| 7,234,183 B2 * | 6/2007 | Elrod et al. | 5/699 |
| 7,254,853 B1 | 8/2007 | Kim | |
| 2007/0267543 A1 | 11/2007 | Boren et al. | |

FOREIGN PATENT DOCUMENTS

| | | |
|---|---|---|
| DE | 90 16 062 U1 | 2/1991 |
| DE | 195 45 168 A1 | 6/1997 |
| DE | 695 05 131 T2 | 6/1999 |
| DE | 102 40 462 A1 | 6/2003 |
| DE | 103 17 356 A1 | 6/2004 |
| DE | 10 2004 013 674 A1 | 10/2005 |
| DE | 10 2006 023 357 A1 | 11/2007 |
| DE | 10 2006 032 891 A1 | 1/2008 |
| EP | 0 529 671 A2 | 3/1993 |
| GB | 1 411 121 | 10/1975 |
| IE | 902327 | 1/1991 |

OTHER PUBLICATIONS

International Search Report dated Aug. 4, 2010 including English-language translation (Six (6) pages).

* cited by examiner

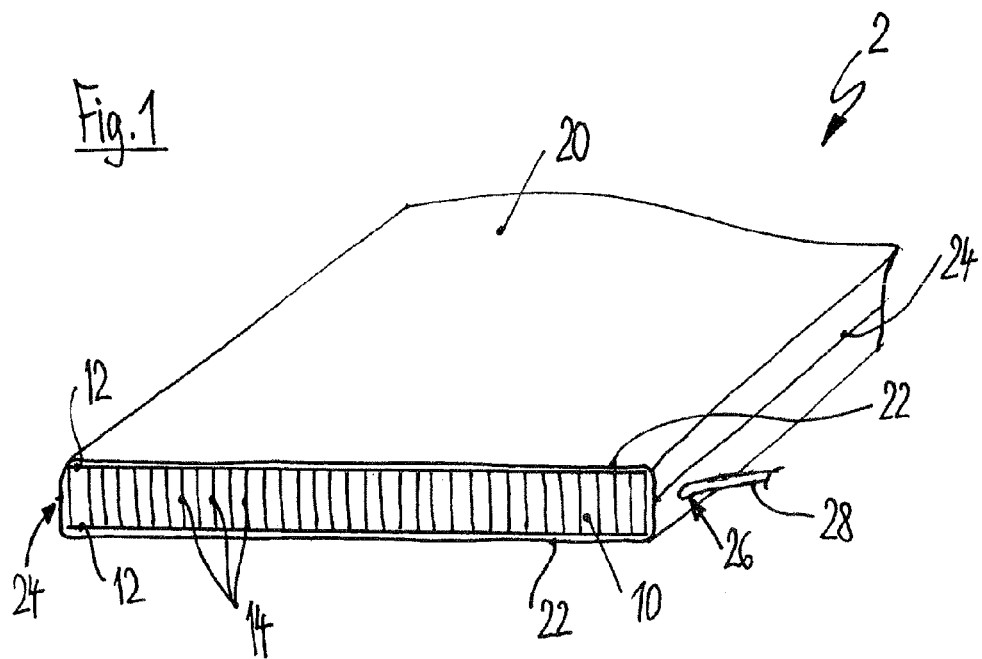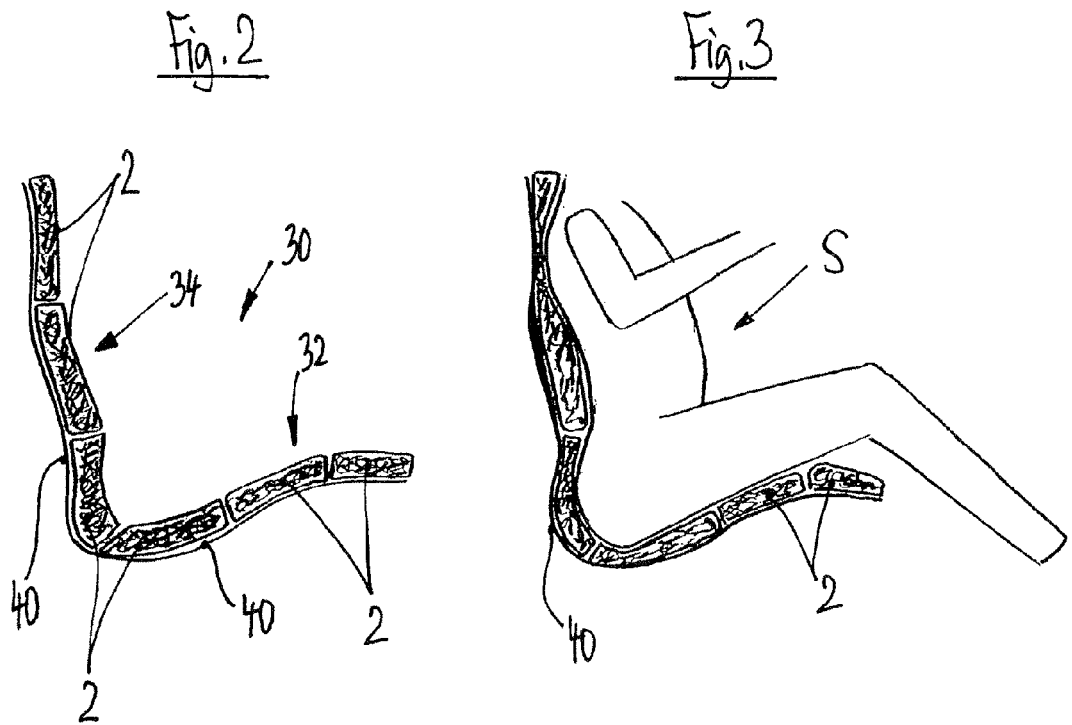

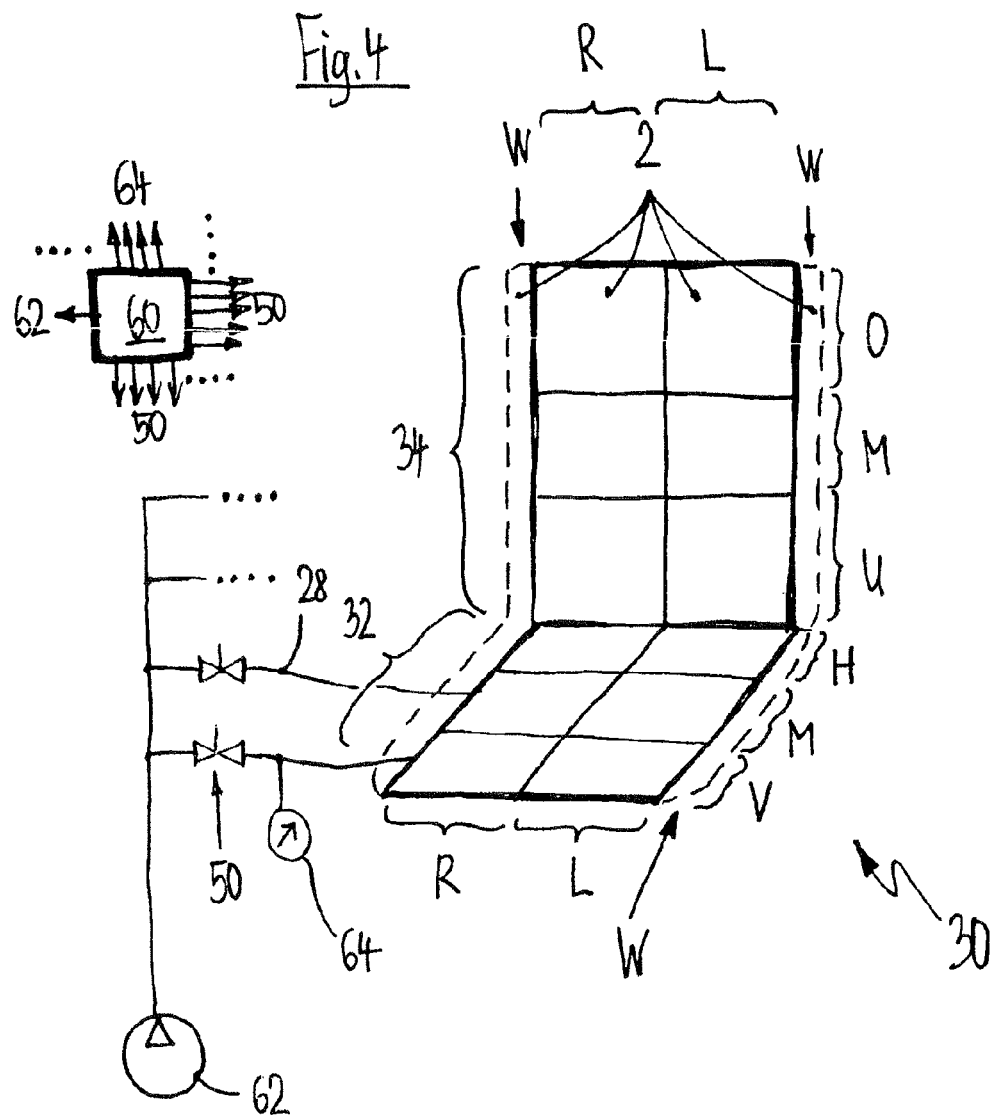

CUSHION FOR A SEAT AND METHOD OF ADAPTING SAME

CROSS-REFERENCE TO RELATED APPLICATIONS

This application is a continuation of PCT International Application No. PCT/EP2010/002073, filed Mar. 31, 2010, which claims priority under 35 U.S.C. §119 from German Patent Application No. DE 10 2009 016 050.7, filed Apr. 2, 2009, the entire disclosures of which are herein expressly incorporated by reference.

This application contains subject matter related to U.S. application Ser. No. 13/186,220, entitled "Process for Producing a Supporting Shell for a Seat," filed on even date herewith, the disclosure of which is herein expressly incorporated by reference.

BACKGROUND AND SUMMARY OF THE INVENTION

The invention relates to a cushion for a seat.

Known seats, for example in motor vehicles, consist of a bearing structure and upholstered cushions, possibly with other components mounted between them. In order to improve ergonomics and comfort, e.g., in vehicle seats, usually adjusting possibilities are provided in order to change, for example, the inclination of the seat surface and/or the backrest, the width of the backrest, etc. Besides that, additional devices like a lumbar support or a massage apparatus may be provided.

The adjusting possibilities will ensure the best possible adaptation of the seat to the individual physiological form of the spinal column and the lower extremities of the person using the seat to ensure the best possible seat comfort. Maximum comfort is achieved if the seat surface and the backrest correlate as congruently and homogeneously as possible with the physiological shape of the person.

For this purpose, placement on a bearing structure of a cushion that has loose filling material or a fluid that can be redistributed with the use of magnetic or electrical fields by application of electrical current, by heating, or by hydraulic excitation, is known, e.g., from DE 10 2006 032 891 A1, in order in this way to adapt the shape of the seat surface and the backrest to the physiological form of the seat user. In addition, DE 695 05 131 T2 describes a cushion for a seat, which as a so-called "vacuum seat" is provided with a bulk material that flows, wherein the cushion can adapt to the body shape of the seat user in that a multi-layer system is moved toward the seat user by application of compressed air.

What is disadvantageous with the known systems is their considerable construction volume and weight.

The object of the invention is to provide a cushion for a seat, especially a seat for a motor vehicle, that is characterized by a simple structure and a low weight with low installation space requirements.

This and other objects are achieved by a cushion according to the invention, as well as a seat with the cushion and methods for adapting the contour of such a seat.

In one aspect of the invention, a known spacer structure with layers arranged parallel to each other that are connected to each other by spacer threads is brought into a casing that is fluid-tight. The casing has a hose line or a connection for a hose line in order to be able to influence the quantity of the liquid inside the casing.

Preferably, the layers arranged parallel to each other are designed as layers of knitted material. However, the spacer structure can naturally have any other type of suitable material instead of the knitted layers, for example fabric layers.

Spacer structures, as described above, are known, e.g., from DE 90 16 062 U1, EP 0 529 671 B1 and DE 10 2006 023 357 A1. Textile spacer structures such as these are distinguished by their elastic upholstery properties under a pressure loading on the surface of the knitted fabric. They are used in mattresses made up of multiple layers, in upholstery covers, etc.

Because of the integration according to the invention of the known spacer structures in a fluid-tight casing with a connection for a hose line, the possibility is produced of "freezing" the form of the spacer structure that results under the load of a seat user, in that after loading of the cushion, the hose line is blocked and/or a vacuum is applied to the inside of the casing. Thus, with cushions that have a relatively thin design, an exact contour adaptation to the body shape of a user can be achieved, which results automatically from the user sitting down and is then fixed. If a different seat user sits down on the seat, the fixing of the cushion is eliminated and a new contour adaptation to the body shape of the following seat user occurs.

On its outside, the cushion has a cover layer that corresponds to the cover layer of known cushions, that is consisting of a textile material, of leather, or the like. To increase the seat comfort, below the cushion a back padding of yielding material, e.g., a foam layer, can be provided to increase the seat comfort.

In a preferred application of the invention, the cushion is used on a non-upholstered bearing structure of a seat, especially on a bearing structure as is described in co-pending application Ser. No. 13/186,220, entitled "Process for Producing a Supporting Shell for a Seat," filed on even date herewith, the disclosure of which is herein expressly incorporated by reference.

Because of the bearing structure, a body-contoured seat is provided that makes possible very good seat comfort. In an especially advantageous manner, the great seat comfort already results in the cushion according to the invention with only little thickness, i.e., little distance of the two knitted layers of the spacer structure, because the contouring of the bearing structure already achieves an adaptation to the body shape of the seat user in question.

The cushion covers, completely or at least almost completely, the entire area of the seat surface and/or the backrest of the bearing structure and thus forms the direct support surface for the seat user. To increase the seat comfort, preferably several cushions are provided, which together cover the area of the seat surface and the backrest.

In one embodiment of the invention, the seat surface area is divided into two, and preferably into three, cushions arranged one after the other. In an analogous manner, the backrest area is divided into three cushions, arranged one above the other. In principle, a higher or a lower number of cushions can also be selected.

The cushions can be divided over the width extension of the seat surface and/or the backrest so that a right/left division results, whereby an individual seat adjustment can occur for the two halves of the body. Naturally, a finer division can also be selected for optimizing the contour adaptation, while weighing the costs connected with the finer division.

In a simplified embodiment of the invention, only one single cushion can be provided per body half in the area of the seat surface and/or the backrest.

Fixing the contour created by a seat user of a cushion according to the invention can occur in that a blocking device is activated in the hose line of the cushion as soon as the seat user compresses the spacer structure and the air has been at least partially displaced from the fluid-tight casing. Because of the reduced air volume in the inside of the fluid-tight sleeve, during unloading, the spacer frame cannot return to its original shape as a result of the retracted casing so the contour of the spacer frame is fixed.

In another embodiment of the invention, a pumping device can be connected to one or more cushions, with which the fluid can be drawn out of the inside of the cushion(s) (suction pump).

Because of the lower pressure on the inside of the cushion (s), an improved contour adaptation of the cushion(s) is achieved when the seat user sits down. Also with lower pressure applied, the contour of the cushion(s) is maintained better after the person leaves the seat than in the casing without a pumping device. In addition, the firmness of the cushion(s) can be regulated by the magnitude of the low pressure when the seat is occupied. In this way, for example, a configuration of the seat firmness in the gradation "comfort"—"normal"—"sport" can be implemented. In principle, a lower pressure is connected with greater firmness of the cushion(s) since the low pressure draws the casing of the cushion(s) together more strongly, by which the elastic spacer frame is compressed.

On the other hand, by use of a pumping device, a fluid can be pumped into the inside of the cushion(s) (positive displacement pump). In this way, a faster and more complete return of the cushion(s) to its/their original uncontoured form is achieved when the seat is unoccupied than is achieved during a self-resetting of the cushion(s) after the end of the loading by the seat user. In addition, with a positive displacement pump operating as a pumping device, an excess pressure can be created in the cushion and/or in the cushions in order to partially firm the cushion surface and/or to create an adjusting motion in the direction of the seat user. Because of this body support function a lumbar support, for example, can be created. Also, with the use of a more complex control of one or more pumping devices in connection with a number of cushions, massage and mobilizing effects can be created.

The fluid is preferably air. However, the cushion and/or cushions can also be filled with a fluid other than air, e.g., with a mixture of water and ethylene glycol or with an oil-like liquid with low viscosity.

The fluid, especially a fluid medium, can be tempered such that with the use of the warmed and/or cooled fluid an increase in comfort for the seat user can be achieved, at least during the sitting phase.

In another embodiment of the invention, a pressure sensor can be provided in at least one hose line of a cushion in order, in connection with a control or regulating device, for the fluid pressure on the inside of the casing to be controlled and/or regulated. In this way, the contour adaptation of the cushion to the seat user can be further improved. In addition, the body support, massage and/or mobilizing functions already mentioned can be implemented in this way. For massaging devices, different functional patterns, e.g., a massage wave running in a longitudinal or height direction of the seat can be implemented with the use of a control or regulation unit. Preferably, the functional pattern is repeated periodically.

If a pumping device is provided, it preferably acts on all or at least a majority of the cushions. The cushions are connected to the pumping device by way of hose lines and possibly valves.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows an exemplary cushion according to the invention in a schematic cross section representation;

FIG. 2 is a schematic side view of an unoccupied seat with cushions according to an embodiment of the invention;

FIG. 3 shows the seat from FIG. 2 under load by a seat user; and

FIG. 4 shows the seat from FIG. 2 in a schematic perspective representation together with control circuits.

DETAILED DESCRIPTION OF THE DRAWINGS

FIG. 1 shows a cushion 2 having an exemplary structure according to the invention. The cushion 2 is for a seat that is designated overall as 30 (see FIG. 2). The cushion 2 is made up of a spacer structure 10 and a casing 20. The spacer structure 10, as is known, has an upper and a lower layer 12 (in each casing designed as a knitted layer), between which spacer threads 14 are arranged.

Spacer structures 10 of this type can be obtained as commercial products, e.g., from Müller Textil GmbH. For explaining the invention, the concrete design of the spacer structure 10 is not important.

The spacer structure 10 is arranged in a fluid-tight casing (overall designated 20), so that a type of "balloon" structure with a reinforcing insert is formed. The casing 20 is composed of an upper material web 22 and a lower material web 22 arranged parallel to it. The two material webs 22 are welded together all around on their edge areas (weld seam 24), and thus the spacer structure 10 is air-tight on the inside of the casing 20. The casing 20 has a connection 26 for a hose line 28.

FIGS. 2 to 4 show a seat 30 that is provided with a number of cushions 2. The seat 30 is divided into one area for the seat surface 32 and one area for the backrest 34. The bearing structure of the seat 30 is formed by a one-part bearing structure 40 that connects the two areas 32 and 34 without transitions. The bearing structure 40 is three-dimensionally contoured. In the areas of the seat surface 32 and the backrest 34, several cushions 2 are provided so that the contour in the various sections, in which the body of a seat user S contacts the seat 30, can be adapted individually. In principle the right half R and the left half L of the seat 30 are structured symmetrically.

Referring to FIG. 4, both the area of the seat surface 32 and the area of the backrest 34 are divided horizontally and vertically into three areas each so that, in total, a division into twelve cushions 2 results. The seat surface 32 is hereby divided into a front area V, a center area M and a rear area H. Correspondingly, there is a division of the backrest 34 into a lower area U, a center area M and an upper area O. Optionally, cushions 2 in the lateral side bolster areas W are possible, both in the area of the seat surface 32 and in the area of the backrest 34, as shown with dotted lines.

FIG. 2 shows the cushions 2 in an unloaded initial state with connection 26 being open so that in the inside of the cushions 2 ambient pressure is present. The upper material webs 22 of the cushions 2 facing away from the bearing structure 40 of the seat 30 run approximately parallel to the contour of the bearing structure 40.

As can be seen from FIG. 3, during loading by a seat user S, the cushions 2, including the spacer structure 10 lying inside them, are compressed, each to a different extent, depending on the contact pressure applied by the seat user S. In this case, the volume of the casing 20 is decreased and a part of the air located on the inside of the casing 20 is displaced out of the casing 20 through the connection 26 and the hose line 28. This condition of the compressed cushion 20 can be fixed by closing a blocking device 50 (see FIG. 4), wherein because of the reduced air quantity in the inside of the casing 20, when the seat 30 is left by the seat user S a return expansion to the original volume is not possible. In this way a seat 30 is available, with cushion surfaces that correspond to the contour determined by the seat user S even without being occupied.

If another seat user S sits on the seat 30, the blocking devices 50 are opened so that the inside of the cushions 2 adjusts to ambient pressure and the cushions 2 assume their original position as shown in FIG. 2.

As can be seen from the exemplary embodiment in FIG. 4, the blocking devices 50 are triggered by a control unit 60. In addition, a pumping device 62 is provided as a pneumatic pump, by which the pressure on the inside of the cushions 2 can be changed. In the exemplary embodiment shown, for each cushion 2 a separate blocking device 50 is provided so that the respective cushions 2 can be controlled individually and independently of each other. In addition, on the hose lines 28, pressure sensors 64 can be provided for detecting the pressure on the inside of the cushions 2. In this way, a signal that represents the pressure on the inside of the cushions 2 is supplied to the control unit 60 as a control variable, in order for example to be able to perform an individual adjustment of the seat firmness depending on the weight of a seat user S.

In summary, the invention can be described as follows: a seat 30 is composed of a bearing structure 40 and a number of cushions 2. The cushions 2 cover the entire area of the seat surface 32 and of the backrest 34 of the seat 30. Each of the cushions 2 is formed of a textile spacer structure 10 that is held in a fluid-tight casing 20. The casing 20 has a connection 26 for a hose line 28. Before the seat user S sits on the seat 30, the hose line 28 is open to the outside air. With the effect of the force applied by the seat user S, the cushion 2, and thus the spacer structure 10 are compressed, whereby simultaneously air is displaced out of the inside of the cushion 2. Because of this, the cushions 2 experience a contouring corresponding to the body shape of the seat user S. After the user is seated, this contouring of the cushions 2 can be fixed. To do so, a blocking device 50 in the hose line 28 is blocked and thus the reduced air volume on the inside of the cushion 2 is separated from the outside air. In this way the contouring of the cushions 2 of the seat 30 is maintained when the seat user S has left the seat 30.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A seat for a user, comprising:
   a non-upholstered seat bearing structure having a contour adapted to a sitting body shape of a user and including a seat area and a backrest area angled relative to one another;
   a plurality of cushions mounted on the seat area and the backrest area of the non-upholstered bearing structure, each cushion having only little thickness and comprising:
   a spacer structure having at least two layers, the layers being arranged parallel to each other and being connected to each other by spacer threads;
   the spacer structure not having any particulate matter therein:
   a fluid-tight casing in which is arranged the spacer structure, the casing comprising two material webs arranged parallel to each other, the two material webs being connected to each other at their side edge areas; and
   at least one connection in the fluid-tight casing through which a fluid quantity of air or a liquid fluid inside the casing is varied, wherein
   a form of the spacer structure resulting under a load of the seat user is freezable by at least one of blocking the connection and applying a vacuum to the inside of the casing, and
   a firmness of the cushion is regulated by varying a magnitude of pressure inside the cushion with a lower pressure achieving a greater firmness by compressing the spacer structure, and
   the plurality of cushions are individually adaptable to the load of the seat user.

2. The seat according to claim 1, wherein one or more cushions cover a majority of at least one of the seat area and the backrest area of the bearing structure.

3. The seat according to claim 1, wherein on the seat area, at least two cushions are arranged one after the other, and on the backrest area, at least three cushions are arranged one above the other.

4. The seat according to claim 3, wherein on at least one of the seat surface area and the backrest area of the seat, at least two cushions are provided next to one other.

5. The seat according to claim 1, wherein on at least one of the seat surface area and the backrest area of the seat, at least two cushions are provided next to one other.

6. The seat according to claim 1, further comprising at least one of:
   a blocking device arranged in the connection; and
   a pumping device coupled with the connection for supplying fluid into the cushion and for removing fluid from the cushion.

7. The seat according to claim 6, further comprising:
   a sensor coupled with the connection for detecting fluid pressure present in the cushion.

8. The seat according to claim 1, further comprising:
   a sensor coupled with the connection for detecting fluid pressure present in the cushion.

9. A method for adapting a contour of a seat with a non-upholstered seat bearing structure having a contour adapted to a sitting body shape of a user and including a seat area and a backrest area angled relative to one another, and a plurality of cushions mounted on the seat area and the backrest area of the non-upholstered bearing structure, each cushion having only little thickness and, which cushions are connected to a blocking device, the method comprising the acts of:
   before a seat user sits down, opening the blocking device so that a compensation occurs between air inside the plurality of cushions and air outside the cushions, each cushion having a spacer structure with at least two layers arranged parallel to one another and connected to one another by spacer threads, the spacer structure not having any particulate matter therein, and a fluid-tight casing in which is arranged the spacer structure, the casing including two material webs arranged parallel to one another and connected with one another at side edge areas; and after the seat user is completely seated, closing the blocking device to freeze a form of the spacer structure resulting from a load of the seat user inside the fluid-tight casing even if the user is no longer seated, wherein a firmness of the cushion is regulated by varying a magnitude of pressure inside the cushion, with a lower pressure achieving a greater firmness by compressing the spacer structure, and the plurality of cushions are individually adaptable to the load of the seat user.

10. The method according to claim 9, further comprising the act of:

opening the blocking device again before another seat user sits down.

11. A method for adapting a contour of a seat with a non-upholstered seat bearing structure having a contour adapted to a sitting body shape of a user and including a seat area and a backrest area angled relative to one another, and a plurality of cushions mounted on the seat area and the backrest area of the non-upholstered bearing structure, each cushion having only little thickness and, which cushions are connected to a pumping device for air or a liquid fluid, the method comprising the acts of:

before a seat user sits down, filling the plurality of cushions with the air or liquid fluid, the cushion having a spacer structure with at least two layers arranged parallel to one another and connected to one another by spacer threads, the spacer structure not having any particulate matter therein, and a fluid-tight casing that holds the spacer structure, the casing comprising two material webs arranged parallel to one another and connected to one another at side edge areas;

after the seat user sits down, at least partially removing the fluid from the cushions with the pumping device; and maintaining the state of reduced fluid quantity by closing a blocking device or by blocking the pumping device connection in order to freeze a form of the spacer structure resulting from a load of the seat user inside the fluid-tight casing even if the user is no longer seated, wherein a firmness of the cushion is regulated by varying a magnitude of pressure inside the cushion, with a lower pressure achieving a greater firmness by compressing the spacer structure, and the plurality of cushions are individually adaptable to the load of the seat user.

12. The method according to claim 11, further comprising at least one of the acts of:

opening the blocking device before another seat user sits on the seat; and supplying fluid into the cushions via the pumping device before another seat user sits on the seat.

13. The method according to claim 11, wherein the quantity of the fluid to be removed from the cushion cushions is adjustable in order to change a firmness of the cushion.

14. The method according to claim 11, wherein to create a support effect for a body part of the seat user, fluid is supplied into the cushions with positive pressure.

15. The method according to claim 11, wherein for creating at least one of a massage and mobilizing effect for a body part of the seat user, fluid is supplied into the cushions so it varies periodically, and removed from the cushions so it varies periodically.

* * * * *